Sept. 1, 1964 F. A. GUERTH 3,147,335
OPTICAL MISS-DISTANCE INDICATOR
Filed Oct. 27, 1960 3 Sheets-Sheet 1

INVENTOR.
FRITZ A. GUERTH
BY
Howard J. Mumey Jr. AGENT
George J. Rubens ATTORNEY Sept. 1, 1964 F. A. GUERTH 3,147,335
OPTICAL MISS-DISTANCE INDICATOR
Filed Oct. 27, 1960 3 Sheets-Sheet 2

INVENTOR.
FRITZ A. GUERTH

Sept. 1, 1964  F. A. GUERTH  3,147,335
OPTICAL MISS-DISTANCE INDICATOR
Filed Oct. 27, 1960  3 Sheets-Sheet 3

INVENTOR.
FRITZ A. GUERTH
BY
AGENT
ATTORNEY

United States Patent Office 3,147,335
Patented Sept. 1, 1964

3,147,335
OPTICAL MISS-DISTANCE INDICATOR
Fritz A. Guerth, Camarillo, Calif., assignor to the United States of America as represented by the Secretary of the Navy
Filed Oct. 27, 1960, Ser. No. 65,553
6 Claims. (Cl. 88—1)
(Granted under Title 35, U.S. Code (1952), sec. 266)

The invention described herein may be manufactured and used by or for the Government of the United States of America for governmental purposes without the payment of any royalties thereon or therefor.

The present invention relates to a method and apparatus designed to measure the miss-distance, or firing error, between a missile, rocket or projectile and an air-borne target.

As the design of missiles becomes increasingly more sophisticated, it is extremely important to have some definite measure of their accuracy in a combat environment. It is therefore desirable to have available an air-borne vehicle capable of acting as a target, and to install on such target apparatus which will compile data useful in assessing the performance of a missile launched in combat with the intention of scoring a direct "hit" on the target, or, under test conditions, to pass in close proximity thereto.

It has long been recognized that a radiant energy system can be devised which, when carried by a target aircraft, makes use of the so-called Doppler effect to yield a signal which varies in frequency as a function of changes in the distance between the missile and the target aircraft. Assuming that the direction and velocity of the missile remain substantially constant for the period of measurement (and also assuming of course that the missile does not impact the target), then the Doppler beat frequency is relatively high when the missile is at some distance from the target, decreases in frequency as the missile approaches, goes through "zero" when the target and missile are in proximity, and then again increases in frequency as the missile draws away from the target. Recording of this Doppler signal yields data which should normally be sufficient to compute the miss-distance per se. However, neither the direction of passage of the missile relative to the target can be determined from this Doppler signal, nor, more importantly, can the missile's trajectory be ascertained.

A further disadvantage in miss-distance indicators utilizing the Doppler effect is that the energy reflected from the missile and utilized to develop the desired information is of an extremely low value. Spurious reflections from other positions of the aircraft structure may also be present. It has been determined by actual test that the energy reflected in a Doppler system of the above type is usually less than the transmitted energy by an amount equal to 100 to 140 decibels. Since practically all transmitters inherently possess a slight amount of leakage energy, the reflected signal can be masked to such an extent that no useful indication is obtained. It has been proposed to reduce this leakage energy between the transmitter and receiver by providing directional transmitting and receiving antennas as well as balancing networks in the circuitry itself. However, the employment of directional antennas restricts the field which the system is capable of covering at any instant of time, and balancing networks are subject to both electrical and mechanical malfunctions. A still further disadvantage possessed by such systems is that the extreme complexity of the necessarily powerful receivers and amplifiers adds greatly to the weight which the target must carry and hence reduces its speed and maneuverability. The extremely high speed capabilities of missiles now in use and/or projected place severe limitations not only on the size and weight of test apparatus carried by targets which must possess corresponding capabilities but also on the reliability of this apparatus, and the complexity of Doppler systems makes it extremely difficult to meet even minimum requirements along these lines.

It has long been known that a miss-distance indicator should ideally possess certain characteristics. An obvious condition is that the indicator should be of the passive type—that is, one which requires no additions whatsoever to the missile itself. Then, too, it should be capable of use under all weather conditions. Further, it should indicate the miss-distance of missiles having any direction of approach to the target aircraft. Above all, it should be extremely reliable in its operation, and should yield information which can be readily evaluated by personnel at a ground location. Finally, it should be flexible in the sense that the derived data may either be recorded directly on the target aircraft or telemetered for recording or processing at a remote point.

As an alternative to the above-discussed systems operating on an electrical basis, it has been suggested that an optical arrangement be employed to photographically record the approach of a missile by means of one or more cameras mounted on the target. Under ideal conditions, such as where the general direction of approach of the missile is known or can be predicted, optical systems of this nature have yielded useful information. However, to be practical in all environments, many separate cameras are required to cover all positional aspects of approach of a missile, and, furthermore, such cameras are obviously limited in their range by meteorological conditions and by the necessity of distinguishing the missile from any background which would serve to obscure its position. Still further, in order to ascertain the missile's trajectory, the operation of all of the cameras mounted upon the target must be accurately synchronized so that a continuous record of missile passage can be obtained. Another drawback inherent in such arrangements is the quantity of film required to maintain the cameras in operation for any prolonged period of time. Still further, the photographic information obtained cannot readily be transmitted from the target to a ground location except by involved techniques which would in many instances be impractical under the conditions described.

In accordance with a feature of the present invention, certain of the best aspects of an optical miss-distance indicating technique have been incorporated into an electrovisual system for deriving, transmitting, recording and analyzing information to yield not only the miss-distance of a missile passing in proximity to an air-borne target, but also to present a complete picture of the missile's trajectory in the target's vicinity. Consequently, a much more complete evaluation of the missile's capabilities with respect to reaching its objective is made possible than could be achieved by utilizing any system heretofore available.

The basic concept underlying the system herein disclosed is that, if a plurality of plane surfaces, or planar sensing zones, are established around an air-borne target, then a missile passing in the vicinity of the target will cut through a minimum number of these plane surfaces at points which, when interconnected, will define the missile's trajectory. In the preferred embodiment described, these plane surfaces define a solid geometrical figure. If an electrical voltage is then obtained which is representative of each of these points of passage of the missile through the respective plane surfaces, a correlation of these voltages will be determinative of the missile's flight path.

In accordance with one embodiment of the invention, a cathode-ray pickup tube, which may be of the so-called Vidicon or other storage type, is employed to establish each of the plane surfaces mentioned above. The axis of each Vidicon tube is arranged to be normal to the plane with which it is associated, and a conical mirror is disposed adjacent the Vidicon photocathode. The latter is arranged to "see" an annular section of the surface of this mirror, and the latter receives through a circular aperture light which is representative of the conditions existing in the particular plane of interest. When four of these camera tubes are mounted on the target aircraft at predetermined angles with respect to one another, each tube can be operated to scan a portion of space represented by one particular plane angularly related to the longitudinal axis of the target. If this scanning is in a circular direction corresponding to the portion of the conical mirror which receives light representing a predetermined plane and directs it to the tube's photocathode, then it will be stored so that any object lying within the plane will cause an irregularity or change in the voltage output of the tube as the scanning beam passes this particular point in its sweep. If each tube is provided with a reference marker indicative of the beginning of each sweep cycle, then the signals developed by each tube during passage of a missile in the target's vicinity will represent the angular relationship of the point of missile passage through that particular plane with respect to the target axis and can be used in computing the missile's trajectory. These output signals from the respective Vidicon tubes are of a nature readily capable of recording by photographic methods, by storage on tape, or for telemetering to a remote point. Furthermore, the data thus obtained can be handled without modification by standard computers to provide almost instantaneously the miss-distance information desired.

Tests have shown that a system designed in accordance with the described embodiment of the present invention can observe and record the presence of an object (such as a missile) passing a target at a relative velocity of Mach 4 if the object has a length of only five feet, regardless of its distance from the target within the limits of visibility. Under normal environmental conditions, this range of observation extends to approximately 100 yards, and can be made even greater by employing camera tubes of high sensitivity and/or resolution. Furthermore, with a higher scan rate and a suitable photosensitive surface on the storage tube, missiles passing the target at much higher velocity can be recorded.

One object of the present invention, therefore, is to provide a system for measuring the miss-distance, or firing error, between a missile, rocket or projectile and an air-borne target.

Another object of the invention is to provide a miss-distance indicator, operating upon electro-optical principles, in which there is established around an air-borne target an imaginary solid figure through which the missile passes, and in which data is derived representative of the points at which the imaginary solid figure is thus penetrated.

A further object of the invention is to establish an imaginary geometrical figure surrounding an air-borne target, such imaginary geometrical figure being defined by a plurality of plane surfaces, and then to establish the angular relationship in each plane surface between the point of penetration of a missile passing therethrough and an arbitrary zero reference position, so that correlation of the angular data thus obtained will yield an accurate picture of the missile's trajectory.

A still further object of the invention is to provide a miss-distance indicator which is not only reliable in operation but also simple in design and inexpensive to construct.

Other objectives and many of the attendant advantages of this invention will be readily appreciated as the same become better understood by reference to the following detailed description when considered in connection with the accompanying drawings wherein.

Figure 1:
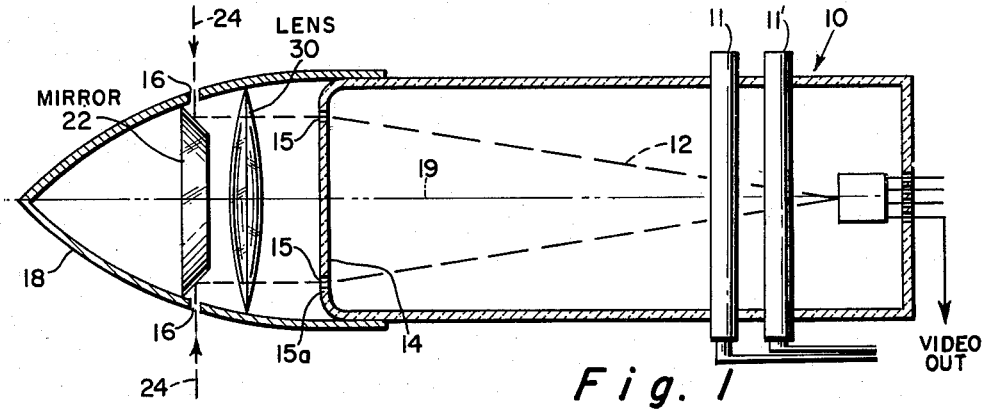
FIG. 1 is a cross-sectional view of a cathode-ray pickup or camera tube of the type employed in practicing the present invention, together with an optical system arranged to permit scanning by the tube of a region defined by a plane lying essentially normal to the tube's longitudinal axis.

It has been stated above that the basic concept underlying the disclosed preferred embodiment of the present invention, is that, if a plurality of plane surfaces are established which form a virtual solid figure enclosing an air-borne target, then a missile passing close to this target will cut through (or intercept) a minimum number of these plane surfaces at points which, when interconnected, will define the missile's trajectory. To achieve this objective, it is only necessary to derive an electrical voltage which is indicative of each of these points of passage of the missile through the respective plane surfaces. Standard computer techniques are then available to correlate such voltages to yield the information sought.

In accordance with the described embodiment of the invention, a number of cathode-ray camera or pickup tubes, preferably of the so-called Vidicon or image orthicon type, are employed to establish the respective plane surfaces which, taken together, define the virtual solid figure above mentioned. Each of these cathode-ray pickup tubes is provided with an optical system disposed adjacent the photosensitive screen thereof, such optical system acting to direct light to the tube screen through an angle of essentially 90°. Consequently, when the scanning beam of the cathode-ray tube is deflected in circular fashion to trace an annular path on the tube's mosaic, this scanning action will cover a field of view which is essentially planar and lies normal to the tube's principal axis. In other words, by means of such an optical arrangement, each cathode-ray storage tube of the invention is arranged to receive illumination emanating within a portion of space which is essentially planar and normal to the undeflected position of the cathode-ray beam of the tube. Such a tube, together with its associated optical system, is schematically set forth in FIG. 1 of the drawings. This tube, generally identified by the reference numeral 10, has developed therein an electron beam 12 which is deflected in conical fashion by the application of suitable quadrature currents to a pair of conventional deflection coils 11 and 11'. As a result, the scanning beam 12 traces an annular path on the mosaic 14 of the tube.

Figure 1A:
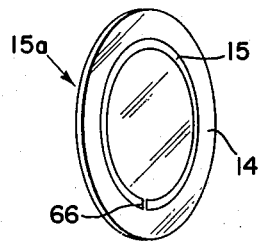
FIG. 1(a) is a perspective view of a portion of the camera tube of FIG. 1, showing the manner in which a reference marker has been inscribed on the annularly-sensitized face of the tube.

The camera tube 10 is formed with an annularly-sensitized surface portion 15 on which light is intended to be received, this sensitized portion 15 being associated with the tube end wall 15a as shown in FIG. 1(a). The scanning beam 12 of the tube is caused to trace a pattern which results in the beam traversing that part of the mosaic electrode associated with this annular light-responsive portion 15, so that variations in the light impinging the surface portion 15 will cause a change in the electrical output of the tube in a well-known manner. To cause light to thus impinge on surface 15, an optical system is arranged so as to receive light passing through an annular slot 16 formed in a shell 18 configured as a surface of revolution having an axis coinciding with the principal axis 19 of the cathode-ray tube 10. As shown in FIG. 1, this shell 18 prevents all light from reaching the sensitized surface portion 15 except that which passes through the slot 16. Disposed adjacent the annular slot 16 and within shell 18 is a portion of a conical mirror 22 which also defines a surface of revolution having an axis coinciding with the common axis 19 of tube 10 and shell 18. This mirror 22 has a surface configuration such that light rays (indicated by the reference numeral 24) emanating in a plane normal to the axis 19 of both the cathode-ray tube 10 and the shell 18 are reflected along a path essentially parallel to the tube axis 19 until they impinge the face plate 15a of the cathode-ray tube. Due to the conical nature of the mirror 22, the light rays 24 will form a beam which establishes on the tube end wall an illuminated region substantially coinciding with the sensitized face plate portion 15 shown in FIG. 1(a). To aid in the focusing process, a lens 30 is interposed between the conical mirror 22 and the face plate of the storage cathode-ray tube.

It will not be appreciated that, with an arrangement such as shown in FIGS. 1 and 1(a), the electron beam 12 of the cathode-ray tube, when circularly rotated, will scan a region of space defining a plane, and that the light rays 24 in their entirety will be respresentative of the illumination or visual conditions existing in such plane. Consequently, as the beam 12 is rotated, variations in light intensity within the plane will cause corresponding variations in the tube's output signal. In other words, all conditions existing within this plane that produce changes in the intensity of the light rays 24 will cause these light variations to appear as electrical variations suitable for utilization in any desired manner.

Figure 2:
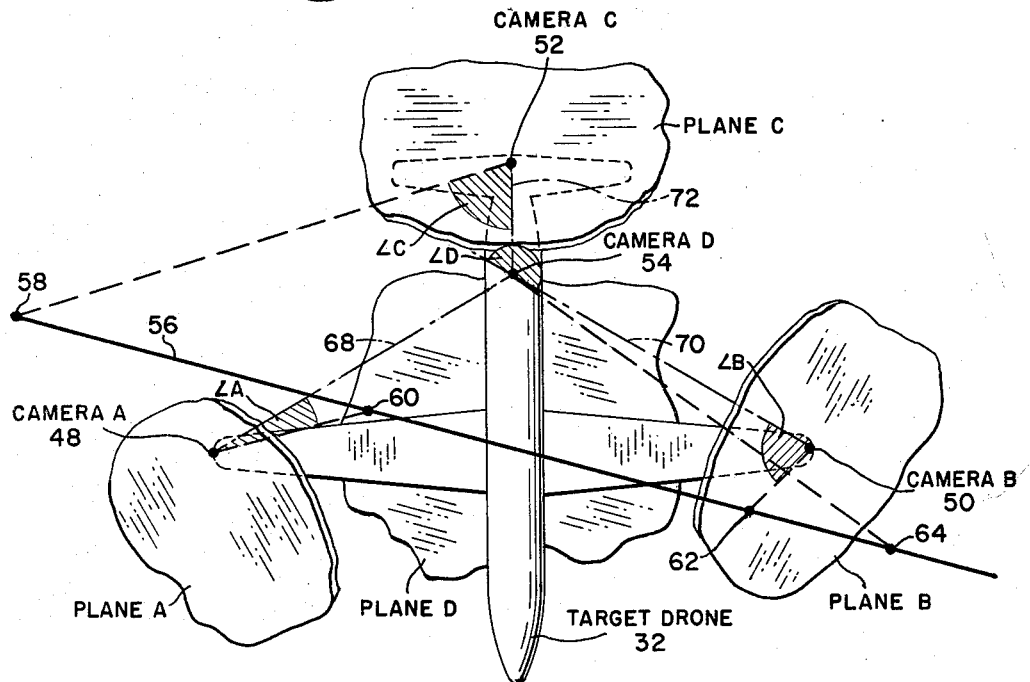
FIG. 2 is a schematic showing in elevation of a target aircraft on which the miss-distance indicator of the present invention has been installed, also showing preferred locations for the camera tubes employed in deriving the information required to determine missile trajectory.

In FIG. 2 there is schematically illustrated an airborne target 32 on which the miss-distance indicator of the present invention has been installed, such target being, for example, a drone aircraft. In accordance with the embodiment shown, the target 32 has mounted thereon four combined cathode-ray pickup tube and optical units, each of which may be similar in design to that set forth in FIGS. 1 and 1(a). For convenience of description, each assembly such as shown in FIG. 1 will be generically termed a "camera," which term is thus broadened to include its associated optical apparatus as well. As brought out in FIG. 2, the target 32 carries four of these cameras respectively mounted on the two wing tips, the tail and the underside of the fuselage. To assist in the following description, the two wing cameras will be designated A and B, respectively, the tail camera, camera C and the fuselage, or belly unit, camera D. Before proceeding further, it should be mentioned that the effective field of view of each camera is determined primarily by its sensitivity and by the degree of amplification of the tube's output signal. These factors are capable of wide variation, and, as the present description proceeds, it will become apparent that each camera's field of view need only be sufficient to include the points of missile passage through the respective planes. The dimensions of this solid figure are governed primarily by the angular positioning of each camera, and it is normally adequate if the range of each camera extends to approximately 100 yards. However, as previously stated, this depends upon the operating requirements of the miss-distance indicator as a whole.

Figure 3:
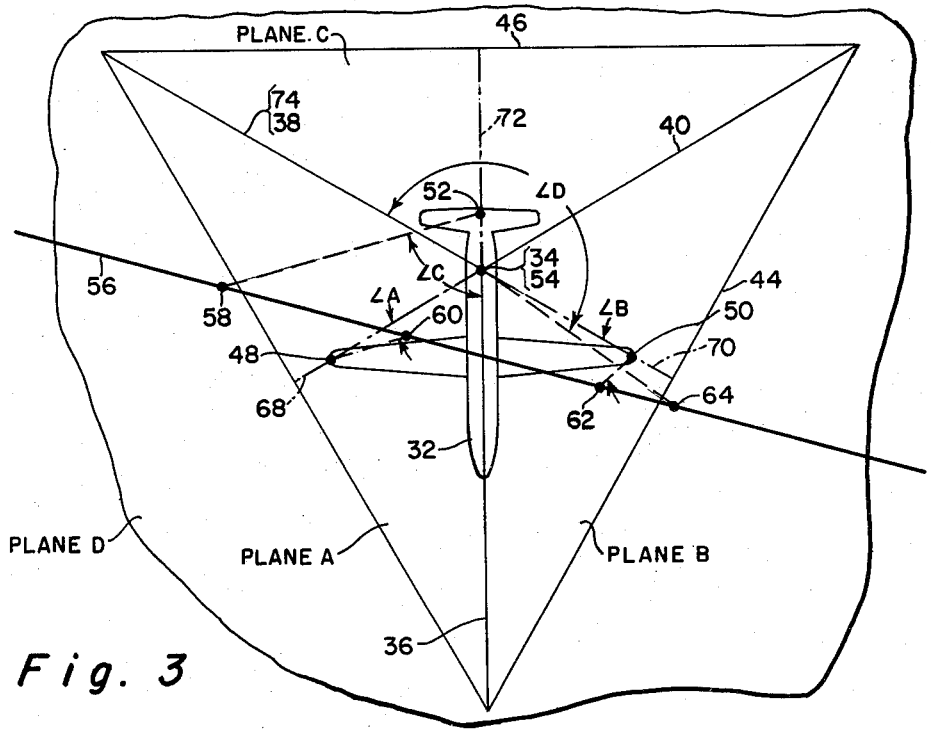
FIG. 3 is a schematic showing of a target aircraft along the lines of FIG. 2, illustrating the manner in which the various plane surfaces intersect one another to form an imaginary solid figure enclosing the target.
Figure 4:
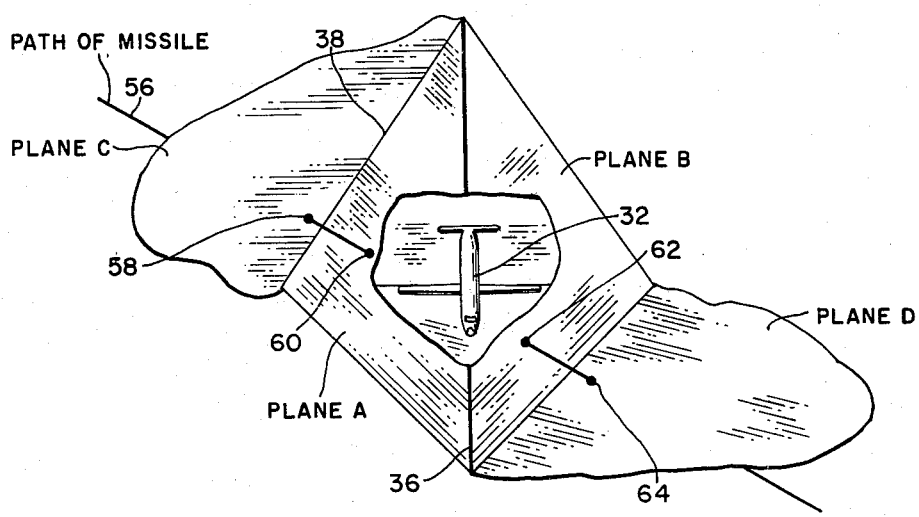
FIG. 4 is a perspective view of FIG. 3, bringing out more clearly the points at which the missile passes through each of the plurality of plane surfaces.

To understand the manner in which the virtual solid figure is established which encloses the drone aircraft 32, it is believed that concurrent consideration of FIGS. 2, 3 and 4 will be helpful. First, however, it should be recognized that cameras A and B, which are respectively mounted on the outer wing tips of the target aircraft 32, are disposed so that each tube's axis lies at an angle both to the longitudinal center line of the aircraft and also to a horizontal plane. Thus, the tube's axes are turned so that each tube is inclined forwardly and in addition turned upwardly. The tail camera however, is adjusted so that its axis remains in a vertical plane which includes the longitudinal center line of the aircraft, but is tilted in this plane so that its face is inclined upwardly in the same manner as that of the cameras mounted on the target's wing tips. If this angle of inclination of each of cameras A, B and C is identical, then the plane scanned by camera A will lie at an angle of approximately 60° to the horizontal, as will the planes respectively scanned by cameras B and C. Reference to FIG. 3 will perhaps best bring out that these three planes A, B and C intersect at a common point 34 lying above the fuselage of the target aircraft 32, and FIG. 4 will assist in bringing out the three planes A, B and C thus established will, in effect, define an imaginary geometrical figure in the form of a pyramid having an apex at point 34. In FIG. 2 these planes A, B and C are shown in fragmentary fashion to more closely illustrate certain angular relationships to be hereinafter described. Camera D, carried in the fuselage of the drone aircraft 32 has its axis directed downwardly so that the plane scanned by the electron beam of the camera lies "horizontally" with respect to the aircraft body. In other words, this plane D is parallel to the plane of the paper on which the illustration is presented. Consequently, plane D forms the under surface or "base" of the geometrical figure established by planes A, B and C, so that the four planes *taken as a unit* define a virtual solid completely enclosing the target aircraft 32.

This mutual relationship between planes A, B, C and D is further brought out by the showings of FIGS. 3 and 4. The former is taken from the same viewpoint as that of FIG. 2; that is, it is a plan view of the drone aircraft 32. However, in FIG. 3 the planes A, B and C have been extended, so that the lines of intersection therebetween can be illustrated. It will be noticed that planes A and B meet in a line 36, planes A and C meet in a line 38, and planes B and C meet in a line 40. These three lines 36, 38 and 40 converge at the apex 34 of the pyramid which it has been previously stated is formed by the planes. To complete the virtual solid figure surrounding the target 32, the "horizontal" plane D established by camera D intersects each of the three remaining planes along the lines 42, 44 and 46 respectively. It will be noted that these lines of intersection 42, 44 and 46 define an isosceles triangle as viewed in FIG. 3.

Referring again briefly to FIG. 2, it will be recalled that the camera A is mounted on one wing tip of the target aircraft 32 so that it may be said to be optically centered at a point 48 insofar as plane A is concerned. In similar fashion, camera B may be designated as having an optical center 50, camera C an optical center 52, and camera D an optical center 54. These camera mounting points have been transposed into FIG. 3 and given the same reference numbers therein. It will be noted that due to the manner of taking the plan view in FIG. 3, the mounting point 54 for camera D coincides with the projected point 34 representing the apex of the pyramid formed by planes A, B and C. To aid in the following description, the plane D as seen in FIG. 3 is extended beyond the boundaries 42, 44 and 46 (as shown by the irregular line) so that it may include the point of missile passage through such plane in a manner now to be set forth.

It can be demonstrated that no object (such as a missile or rocket) can pass in the immediate vicinity of the target aircraft 32 without intercepting each of the planes A, B, C and D, unless its trajectory is exactly parallel to one of the planes. This unusual condition will be disregarded, and the following description will be based upon an assumption that all of the planes are intercepted. A visual representation of a typical missile flight path is depicted in FIG. 4, wherein the trajectory of the missile has been assigned the reference number 56. This trajectory is shown as being essentially linear, and intersects plane C at the point 58, plane A at point 60, plane B at point 62, and plane D at point 64. It will be noted in FIG. 4 that for the sake of facilitating the description plane C has been extended outwardly beyond the boundary line 38 so as to include this point of missile interception 58. Plane D is extended in FIG. 4 in the same manner as plane C to include the point of interception 64. It should be clearly understood that the various planes A, B, C and D do not terminate at their lines of intersection with the remaining planes but instead each extends beyond such points to the maximum limit of visibility permitted by the sensitivity of the pickup tube by means of which it is defined. However, such extensions have been omitted in most cases in the drawings in order not to obscure the essential features of the invention, and only in the case of plane D in FIG. 3 and planes C and D in FIG. 4 have such extensions actually been illustrated. Summarizing, therefore, it is understood that the assumed trajectory 56 of a missile passes through plane C at point 58, through plane A at point 60, through plane B at point 62, and through plane D at point 64. The normal flight path of a missile for such a short distance is such that the four points 58, 60, 62 and 64 define essentially a straight line.

It is a basic principle underlying the present disclosure that if these four points 58 through 64 can be located in some definite manner and represented by electrical quantities, then these quantities can be correlated to yield the trajectory 56, and, accordingly, the miss-distance information desired. To achieve this objective, each of the camera tubes of FIGS. 1 and 1(a) is designed so that the location of any point in the plane scanned thereby (representing passage of a missile through the plane) can be angularly related to a certain fixed reference point, or marker, which remains constant in position during each scanning cycle of the tube's cathode-ray beam. This may be accomplished, for example, by inscribing upon the annular photosensitive portion 15 of the tube end wall 15a a discontinuity or gap 66, so that each time the circularly-scanning cathode-ray beam passes the gap 66 a reference or data pulse will appear in the output circuit of the cathode-ray tube.

The location or position of the gap 66 marked on each annular screen portion 15 may be chosen arbitrarily. However, in the embodiment being described, this gap or marker 66 is located so as to coincide radially with a "vertical" line drawn from the apex 34 of the pyramid shown in FIG. 3, for example, down to one of the base lines 42, 44 and 46. This vertical delineation is represented by the reference number 68 in plane A, 70 in plane B, 72 in plane C, and 74 in plane D. However, in plane D this delineation 74 coincides with a projection of the intersection line 38 between planes A and C, so that it is not visible in the drawing.

Figure 5:
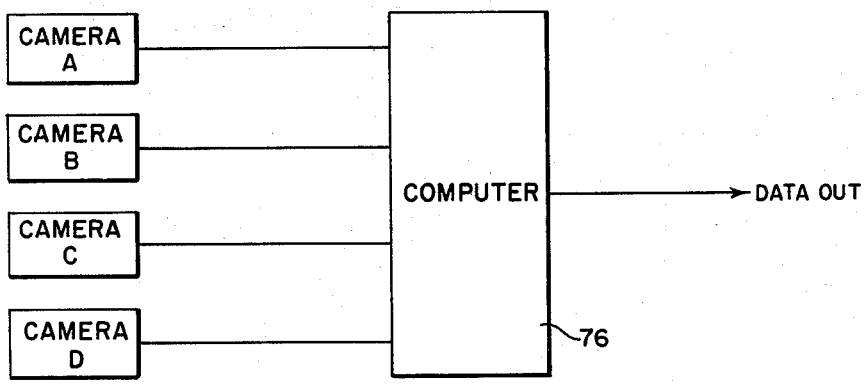
FIG. 5 is a block diagram of an electrical circuit by means of which the respective outputs of each of the camera tubes of the present invention may be fed to a computer in order to correlate the information represented thereby.

It will now be appreciated that the electron beam of camera A, in scanning plane A from the central optical point 48, will develop in the output of the camera a reference pip or marker each time that the scanning beam traverses the gap 66, the latter being aligned with the delineation 68 (FIG. 3) representing a zero angle with respect to the vertical insofar as camera A is concerned. This same scanning beam, however, will also intercept a variation in the light rays 24 produced by passage of the missile through plane A at point 60. The angular relationship between the delineation 68 and the line formed by radially connecting the scanning center 48 with the missile intersection point 60 can be designated as angle A. In plane B, the line connecting the scanning center 50 with the missile intercept point 62 forms an angle B with the vertical delineation 70, while in plane C the light interruption caused by passage of the missile therethrough at point 58 forms an angle C with the vertical delineation 72. With respect to plane D, the vertical delineation 74 therein forms an angle D with the missile's interception point 64, taken radially from the camera location 54. Consequently, each of planes A, B, C and D when scanned by its respective camera tube has present therein information in the form of angular data taken with respect to a predetermined zero reference point, and this information can be evaluated to yield the missile's trajectory, such as by feeding the outputs of the four camera tubes to a conventional computing device 76 such as shown in FIG. 5.

Figure 6:
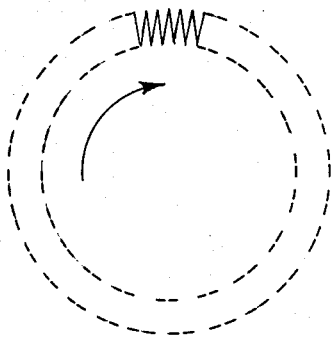
FIG. 6 is an illustration of one manner in which the cathode-ray beam of the camera tube of FIG. 1 may be both radially and circularly deflected so as to in effect generate a series of pulses.

Although it is practicable to deflect the electron beam of each camera tube so that the photosensitive screen portion thereof is scanned only in circular fashion, nevertheless in many cases it is preferable to not only produce a circular scanning, but to superimpose upon this circular scanning a periodic radial deflection. Consequently, the beam will trace an exemplary path such as shown in FIG. 6. As an example, the circular deflection rate may comprise 100 complete sweeps per second, while the radial deflection may be at a rate of 50 kilocycles. It has been found in practice that such deflection frequencies ensure that a missile or other object having a trajectory such as illustrated in FIG. 3 by the reference numeral 56 will be observed by the disclosed miss-distance indicator if it has a minimum length of 5 feet, regardless of its distance from the drone aircraft 32 within the limits of visibility of the respective camera tubes.

Figure 7:
FIG. 7 is a presentation of one complete scanning cycle of the cathode-ray tube of FIG. 1 when deflected in a manner such as set forth in FIG. 6 after the circular sweep component has been removed.

When the beam of the camera tube is deflected as shown in FIG. 6, it is possible to eliminate the circular deflection component from the presentation of data on some visual observation device such as an oscilloscope. This yields a series of pulses representing the radial deflection component only, such display having an essentially horizontal base line as shown in FIG. 7. In this latter figure, the pulse discontinuity identified by the reference numeral 78 indicates the position of the gap 66 in the annular sensitized region 15, while the pulse discontinuity 80 is representative of the light variation produced at point 60 (for example) when a missile having the trajectory 56 passes through plane A. Obviously a similar series of pulses is derived for each of the four camera tubes, and these pulses represent the electrical variations which are feed to the computer 76 of FIG. 5. The latter may be of any suitable design, and operates to compute from the individual camera tube output signals the trajectory 56 which can then be readily documented in permanent form for subsequent evaluation and/or analysis.

It will be obvious to those skilled in the art that the respective electrical outputs of the four camera tubes can either be recorded on tape in the target aircraft 32, or these outputs can be telemetered to a ground location for feeding to the computer 76. Such telemetering is preferably carried out by one of many available multiplexing methods to conserve spectrum band width.

When the pulse output of each camera tube is in the visual form illustrated in FIG. 7, precise determination of the angle involved may be made merely by counting the number of pulses appearing between the data marker 78 and the missile intercept marker 80. Many types of pulse-counting arrangements are available to convert this information directly to digital form.

Although the virtual solid figure enclosing the target aircraft has been indicated as being formed by four plane surfaces, or planar sensing zones, it is obvious that other geometrical figures defined by a larger number of plane surfaces may be established. Although the results obtained by the described embodiment are entirely satisfactory, greater precision may be achieved by presence of additional missile intercept points.

Obviously many modifications and variations of the present invention are possible in the light of the above teachings. It is, therefore, to be understood that within the scope of the appended claims the invention may be practiced otherwise than as specifically described.

I claim:
1. In a miss-distance indicator for measuring the miss-distance between a missile and an air-borne target of elongated configuration, the combination of:
  at least four cathode-ray scanning devices carried by said target and disposed to respectively scan in cyclic fashion, planar regions surrounding said target, each one of which planar regions intersects at least two other of said planar regions, so that said missile when passing in the vicinity of said target will normally intercept at least three of said planar regions;
  said cathode-ray scanning devices being disposed so that said planar regions define an enclosure following said target with respect to radii originating at the axis of elongation;
  and circuit means for deriving from each of said scanning devices the scanning plane of which has been intercepted by said missile, at least two signals, one of which is a reference signal indicative of a fixed direction in that particular scanning plane and the other of which is indicative of the direction, relative to said fixed direction, of the point at which the said missile passes therethrough;
  and means connected with each scanning device for receiving said signals and for calculating therefrom, the trajectory of said missile.

2. In a miss-distance indicator for measuring the miss-distance between a missile and an air-borne target having a longitudinal axis generally indicative in its direction of flight, the combination of:
  means for establishing at least four sensing zones in the vicinity of said target, each of the sensing zones being substantially planar and intersecting at least two other sensing zones to thereby completely enclose said target with respect to radii originating at the longitudinal axis thereof;
  a plurality of scanning devices mounted on said target and equal in number to the number of scanning zones, each of said devices being disposed to cyclically scan by continuous circular sweeping a planar region in the vicinity of said target defined by a particular one of said scanning zones; means to establish for each sensing zone, a fixed direction therein, said direction being a reference direction for the scanning cycle;
  each of said scanning devices providing a first indication when the scanning direction corresponds to the reference direction of the particular sensing zone;
  each of said scanning devices providing a second indication when said missile passes through the particular one said zones scanned thereby; and
  means connected to each of the scanning devices for determining from the two indications thus provided, the angle between the reference direction in the scanned zone and the radial direction of the point at which the missile passes through the scanning zone.

3. The combination of claim 2, in which:
  the means for establishing a plurality of sensing zones in the vicinity of said target comprises a plurality of optical systems;
  each of said optical systems including a conical mirror the axis of symmetry of which is disposed normal to the sensing zone to be established by said means, means for restricting the incidence of light onto said conical mirror to that which defines the said sensing zone to be established, and means for focusing the light received by and reflected from said conical mirror into a beam of essentially annular configuration.

4. The combination of claim 3, in which each of the said scanning devices includes;
  a photocathode onto which the annular beam developed by the particular associated optical system is directed;
  means for generating a cathode-ray scanning beam;
  and means for deflecting said cathode-ray beam in continuous circular fashion to scan that region of said photocathode onto which the annular light beam developed by one of said optical system is directed.

5. The combination of claim 4, in which said scanning device further includes means to develop a voltage variation indicative of change in the magnitude of the light incident upon one portion of said conical mirror, and hence focused onto the photocathode of said scanning device, whenever an object intercepts a zone effectively scanned by the circularly-sweeping cathode-ray beam of such device.

6. In a miss-distance indicator system for measuring the miss-distance between a missile and an elongated air-borne target, wherein the trajectory of the missile is calculated from knowledge of the direction of a plurality of lines originating at preselected points on the target and terminating at the trajectory of said missile, the method of measuring the direction of said lines which comprises:
  establishing at least four planar sensing zones in the vicinity of said target, orienting said sensing zones to intersect at least two other sensing zones to thereby completely enclose said target with respect to radii originating at the axis of elongation thereof, each of said zones including the origin of one of said lines;
  establishing a reference direction in each sensing zone;
  individually scanning each respective sensing zone;
  deriving from each of said individual scannings signal data representative of the direction with respect to the reference direction of the point of passage of said missile through each such said zones; and utilizing said signal data to indicate the direction of said lines.

References Cited in the file of this patent
UNITED STATES PATENTS

| | | |
|---|---|---|
| 2,176,554 | Hardy | Oct. 17, 1939 |
| 2,960,908 | Willits et al. | Nov. 22, 1960 |
| 2,972,924 | Clemens | Feb. 28, 1961 |